(12) United States Patent
Huch et al.

(10) Patent No.: US 6,412,037 B1
(45) Date of Patent: Jun. 25, 2002

(54) INTERFACE CONFIGURATION FOR CONNECTING DIFFERENT TYPES OF BUSSES TO A PERIPHERAL BUS

(75) Inventors: Martin Huch; Jens Barrenscheen, both of München; Gunther Fenzl, Höhenkirchen-Siegertsbrunn, all of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/195,485

(22) Filed: Nov. 18, 1998

(30) Foreign Application Priority Data

Nov. 18, 1997 (DE) .......................................... 197 51 094

(51) Int. Cl.⁷ ............................................... G06F 13/00
(52) U.S. Cl. .......................... 710/306; 710/305; 710/8; 710/11; 710/16; 710/38; 710/62
(58) Field of Search ............................. 710/62, 129, 11, 710/100, 8, 16, 38, 126, 128, 305–315; 370/402

(56) References Cited

U.S. PATENT DOCUMENTS

| | | | | |
|---|---|---|---|---|
| 4,287,563 A | * | 9/1981 | Huston, Jr. .................. | 710/100 |
| 5,001,704 A | * | 3/1991 | Narup et al. ................. | 370/402 |
| 5,832,244 A | * | 11/1998 | Jolley et al. ................. | 710/129 |
| 5,987,554 A | * | 11/1999 | Liu et al. ..................... | 710/129 |

OTHER PUBLICATIONS

"Intels zweite Busgeneration—Multibus II", Technische Rundschau 21/86, pp. 96–101.

* cited by examiner

*Primary Examiner*—Rupal Dharia
(74) *Attorney, Agent, or Firm*—Laurence A. Greenberg; Werner H. Stemer; Gregory L. Mayback

(57) ABSTRACT

An interface is connected between a bus system and a unit which is to respond through the bus system. The interface is constructed for the simultaneous connection of different types of bus systems. As a result, the interface can cooperate optimally with the units that use it, even when it is used, or is to be capable of being used, by a plurality of units.

12 Claims, 1 Drawing Sheet

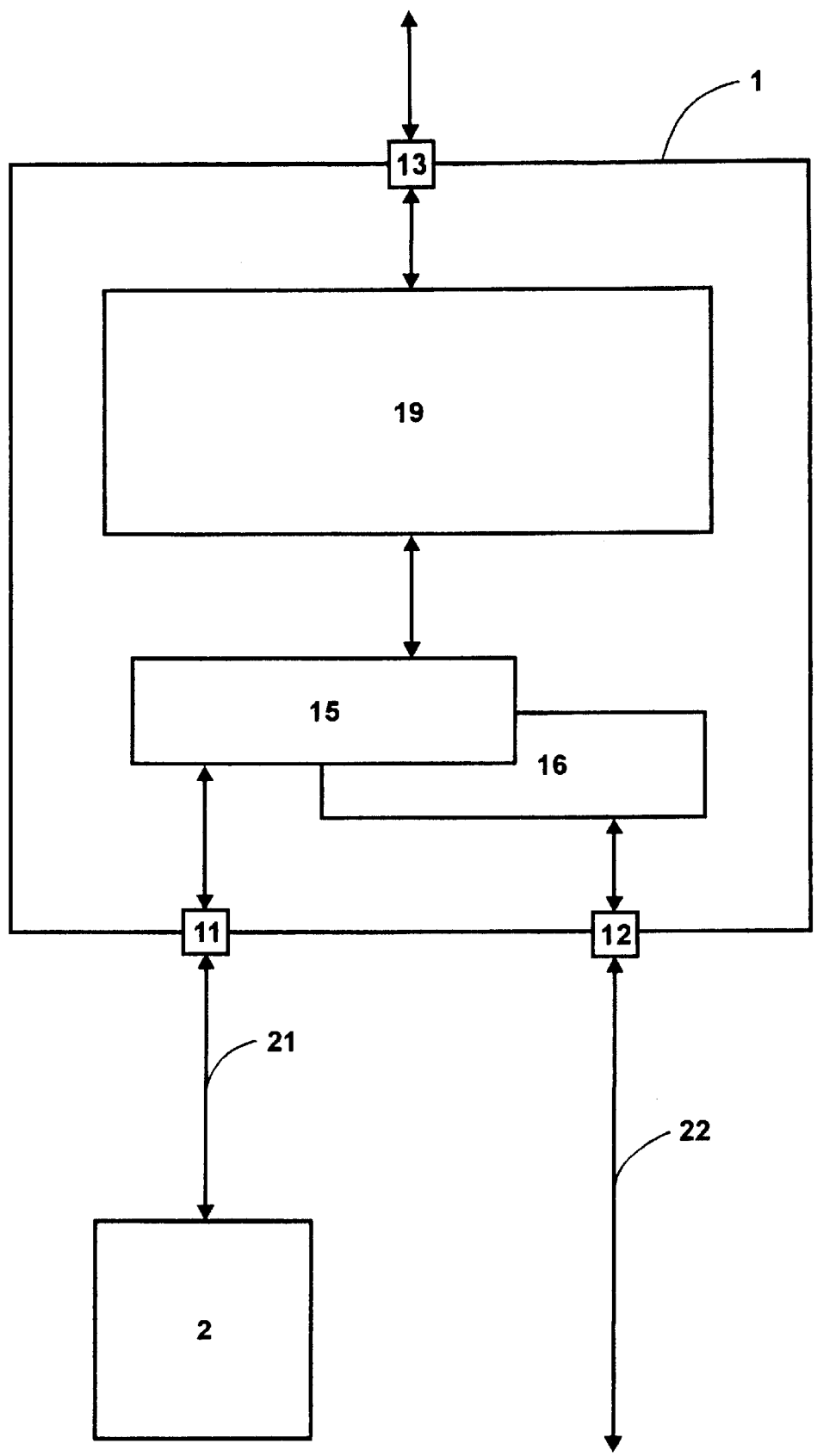

INTERFACE CONFIGURATION FOR CONNECTING DIFFERENT TYPES OF BUSSES TO A PERIPHERAL BUS

BACKGROUND OF THE INVENTION

Field of the Invention

The present invention relates to an interface configuration having an interface between a bus system and a unit which is to respond through the bus system.

Such interfaces are known in a large multiplicity of embodiments. Inter alia, they can be a component of a microcontroller in which case they serve, in particular, for the purpose of coordinating access of a CPU of the microcontroller to external peripheral units such as, for example, an external memory, a timer or other devices. However, they can also be constructed for the purpose of being used by units other than the microcontroller for which they are provided. Such "other units" are referred to below as external processors. In that case, the microcontroller has special pins through which it is possible to make a connection to the interface contained therein, even from outside the microcontroller. Interfaces that are contained in microcontrollers and can be used both by the CPU contained in the relevant microcontroller and by external processors, can certainly be used in many ways but are also known from experience to be relatively slow.

SUMMARY OF THE INVENTION

It is accordingly an object of the invention to provide an interface configuration, which overcomes the hereinaforementioned disadvantages of the heretofore-known devices of this general type in such a way that an interface can cooperate optimally with units using it even when it is used, or is to be capable of being used, by a plurality of units.

With the foregoing and other objects in view there is provided, in accordance with the invention, an interface configuration, comprising different types of bus systems; and an interface for simultaneously connecting the bus systems to a unit for responding through the bus systems.

The connection to an external peripheral unit through different bus systems can be built up by using this measure. This can be utilized to the effect that different types of units are connected to the external peripheral unit through separate bus systems, and this in turn opens up the possibility of selecting or optimizing the bus systems independently of one another while taking particular and exclusive account of the individual properties of the components to be interconnected.

Consequently, an interface has been found which can cooperate optimally with the units using it even when it is used, or is to be capable of being used, by a plurality of units.

In accordance with another feature of the invention, the interface is a module of a microcontroller.

In accordance with a further feature of the invention, one of the bus systems connects a CPU of the microcontroller to the interface.

In accordance with an added feature of the invention, one of the bus systems permits a particularly efficient communication between the CPU of the microcontroller and the interface.

In accordance with an additional feature of the invention, another of the bus systems connects a unit provided outside the microcontroller to the interface.

In accordance with yet another feature of the invention, the other bus system permits a particularly efficient communication between the unit provided outside the microcontroller and the interface.

In accordance with a concomitant feature of the invention, there is provided a switching device for establishing which of the bus systems is being served by the interface.

Other features which are considered as characteristic for the invention are set forth in the appended claims.

Although the invention is illustrated and described herein as embodied in an interface configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a block circuit diagram of an internal structure of an interface according to the invention.

DESCRIPTION OF THE PREFERRED EMBODIMENTS

Referring now in detail to the single FIGURE of the drawing, there is seen an interface which is described in more detail below and is designated by reference numeral 1. In the example under consideration, the interface 1 is a component (module) of a microcontroller. The FIGURE only represents a CPU 2 of the microcontroller, apart from the interface 1. Although the use of the interface 1 in a microcontroller permits very particular advantages to be achieved, it can also be a component of any other desired units, or can be constructed as a separate unit.

The interface 1 can be used both by the CPU 2 of the microcontroller and by non-illustrated units located outside the microcontroller such as, in particular, other microcontrollers, microprocessors, signal processors, etc. The units located outside the microcontroller are referred to below as external processors for the sake of simplicity, although there is no need in this case for them to necessarily be processors. The interface 1 connects the CPU 2 of the microcontroller and/or an external processor to a peripheral unit that is likewise provided outside the microcontroller such as, for example, an external memory, an external timer module or other external devices.

As may be seen from the figure, the interface 1 has a first terminal 11 for connecting a first bus system 21, a second terminal 12 for connecting a second bus system 22, and a third terminal 13 for connection to a non-illustrated peripheral unit.

In the example considered, the first bus system 21 is a so-called PB bus (processor bus). The PB bus 21 is a bus system running exclusively inside the microcontroller and, inter alia, connecting the CPU 2 of the microcontroller to the interface 1.

In the example considered, the second bus system 22 is a so-called XDB bus (external data bus). The XDB bus 22 is led out of the microcontroller through specific pins located therein, and is led further from there to the external processor or processors desiring to use the interface 1.

In addition to the terminals 11 to 13 which were already mentioned, the interface 1 includes a first bus interface 15, a second bus interface 16 and a common control device 19 connected downstream of those interfaces.

The first bus interface 15 is connected through the first terminal 11 of the interface 1 to the first bus system 21, whereas the second bus interface 16 is connected through the second terminal 12 of the interface 1 to the second bus system 22.

It is the task of the bus interfaces 15 and 16 to preprocess individually signals arriving through the respective bus systems 21 and 22. The preprocessing is preferably (but not necessarily) configured in such a way that the signals relayed by the bus interfaces 15 and 16 can be further processed in the downstream control device 19 in accordance with at least a partially uniform scheme. The bus interfaces 15 and 16 further ensure that signals received by the control device 19 are converted for relaying through the first bus system 21 and/or the second bus system 22.

The control device 19 is the central element of the interface 1. Measures are taken in the control device 19 which are required in order to effect a desired communication or a desired correlation between the CPU 2 of the microcontroller and/or of an external processor, and the external peripheral unit.

The interface 1 renders it possible to be able to build up a connection to an external peripheral unit both through the first bus system 21 and through the second bus system 22. As a result, units of different types can be connected to the external peripheral unit through separate bus systems, and this, in turn, opens up the possibility of selecting and/or optimizing the bus systems independently of one another, while taking particular and exclusive account of the individual properties of the components to be interconnected.

This is utilized in the example under consideration with the effect that the CPU 2 comes to be connected to the external peripheral unit through the PB bus, and that the external processor comes to be connected to the external peripheral unit through the XDB bus.

The use of the PB bus for connecting the CPU 2 to the external peripheral unit is optimum, because the communication can be performed through so-called special function registers, and therefore at an extraordinarily high speed.

The use of the XDB bus for connecting an external processor to the external peripheral unit is optimum, because on one hand lack of authorization to access the special function registers of the microcontroller containing the interface 1 means that external processors are not able or allowed to use the PB bus, and because on the other hand the XDB bus communicates by using data pointers, and is therefore a bus which is simple to use and can be used universally.

Of course, instead of the PB bus and/or the XDB bus it is also possible to use any other buses.

In the example considered, the interface 1 is constructed for the purpose of serving only either the first bus system 21 or the second bus system 22 in each case.

In the simplest case, it is possible to provide in this case that the interface 1 can be addressed only through the first bus system 21, that is to say only by the CPU 2 contained in the microcontroller, when the microcontroller containing the interface 1 works as a microcontroller.

However, in the example considered the microcontroller not only operates as a microcontroller. It can also be put into an operating mode in which it acts as a separate interface unit. In this operating mode, the CPU 2 of the microcontroller and, if appropriate, further components of the same (with the exception of the interface 1 and, if appropriate, selected further modules) are deactivated.

If, and as long as, the microcontroller operates only as an interface, the interface 1 can be operated in such a way that it can be addressed only through the second bus system 22, that is to say only by an external processor. The point is that the then-deactivated CPU 2 of the microcontroller does not need to use the interface 1.

The interface 1 contains a non-illustrated switching device and/or separating filter, through the use of which it is possible to establish whether the interface 1 is considering the first bus system 21 or the second bus system 22. The separating filter setting can be established from outside the microcontroller (by applying predetermined signals to the microcontroller pins) and/or internally (using software).

The separating filter can, for example, be set in such a way that the interface 1 considers only the first bus system 21 (not taking account of the second bus system 22) if, and as long as, the microcontroller acts as a microcontroller, and in such a way that it considers only the second bus system 22 (not taking account of the first bus system 21) if, and as long as, the microcontroller is operated only as an interface.

However, it would also be conceivable in a departure therefrom to drive the separating filter in such a way that when the microcontroller is used as a microcontroller, the interface 1 alternately serves the first bus system 21 and the second bus system 22 as required.

The interface 1 described herein is constructed for connecting two bus systems of different types. There is no limitation thereto. It can also be constructed for connecting any desired large number of bus systems of the same and/or different types.

The interface described herein can cooperate optimally with the units using it, independently of the details of practical implementation, even when they are used or are to be capable of being used by a plurality of units.

We claim:

1. An interface configuration, comprising:
    a bus system of a first type;
    a bus system of a second type that is different from said first type;
    a peripheral bus for connection to a peripheral unit;
    a microcontroller including a CPU and a module having an interface for selectively connecting said bus system of said first type and said bus system of said second type to said peripheral bus;
    a bus system, selected from the group consisting of said bus system of said first type and said bus system of said second type, connecting-said CPU of said microcontroller to said interface; and
    another bus system, selected from the group consisting of said bus system of said first type and said bus system of said second type, connecting a unit provided outside said microcontroller to said interface.

2. The interface configuration according to claim 1, wherein said bus system that connects said CPU of said microcontroller to said interface, permits communication between the CPU of the microcontroller and said interface.

3. The interface configuration according to claim 1, wherein said bus system that connects the unit provided outside said microcontroller to said interface permits communication between the unit provided outside said microcontroller and said interface.

4. The interface configuration according to claim 1, including a switching device for establishing which of said bus systems is being served by said interface.

5. The interface configuration according to claim 1, wherein in a first operating mode, said microcontroller functions as a microcontroller, and in a second operating mode, said microcontroller functions as a separate interface unit.

6. The interface configuration according to claim 5, wherein in the second operating mode, said CPU of said microcontroller is deactivated.

7. The interface configuration according to claim 5, wherein in the second operating mode, said interface can only be addressed through said bus system of said second type.

8. An interface configuration, comprising:
a bus system of a first type;
a bus system of a second type that is different from said first type;
a peripheral bus for connection to a peripheral unit;
a microcontroller including a CPU and a module having an interface for selectively connecting said bus system of said first type and said bus system of said second type to said peripheral bus;
a switching device for establishing which of said bus systems is being served by said interface; and
control means for controlling said switching device, said control means selected from the group consisting of software and a configuration disposed outside of said microcontroller.

9. The interface configuration according to claim 8, wherein in a first operating mode, said microcontroller functions as a microcontroller, and in a second operating mode, said microcontroller functions as a separate interface unit.

10. The interface configuration according to claim 9, wherein in the second operating mode, said CPU of said microcontroller is deactivated.

11. The interface configuration according to claim 10, wherein in the second operating mode, said interface can only be addressed through said bus system of said second type.

12. A microcontroller that includes an interface configuration, the interface configuration comprising:
a bus system of a first type;
a bus system of a second type that is different from said first type;
a peripheral bus for connection to a peripheral unit;
a microcontroller including a CPU and a module having an interface for selectively connecting said bus system of said first type and said bus system of said second type to said peripheral bus;
a bus system, selected from the group consisting of said bus system of said first type and said bus system of said second type, connecting said CPU of said microcontroller to said interface; and
another bus system, selected from the group consisting of said bus system of said first type and said bus system of said second type, connecting a unit provided outside said microcontroller to said interface.

* * * * *